(12) United States Patent  
Papke et al.

(10) Patent No.: US 7,669,873 B1
(45) Date of Patent: Mar. 2, 2010

(54) FRONT ROTARY CUTTING DECK HAVING CENTER STEP WITH FRONT VIEWPORT

(75) Inventors: Clark S. Papke, Cortland, NE (US); Justin L. Pryor, Firth, NE (US)

(73) Assignee: Exmark MFG. Co., Inc., Beatrice, NE (US)

( * ) Notice: Subject to any disclaimer, the term of this patent is extended or adjusted under 35 U.S.C. 154(b) by 0 days.

(21) Appl. No.: 12/235,211

(22) Filed: Sep. 22, 2008

Related U.S. Application Data

(62) Division of application No. 11/436,385, filed on May 18, 2006, now Pat. No. 7,451,586.

(51) Int. Cl.
*B62J 25/00* (2006.01)
(52) U.S. Cl. .................................... 280/291
(58) Field of Classification Search .......... 280/291, 280/163, 164.2; 180/6.32, 6.48, 316, 326; 56/14.7; 296/75
See application file for complete search history.

(56) References Cited

U.S. PATENT DOCUMENTS

| | | | |
|---|---|---|---|
| 5,247,784 A * | 9/1993 | Kitamura et al. ............. 56/10.8 |
| 5,337,543 A * | 8/1994 | Kitamura et al. ............. 56/10.8 |
| 2004/0113388 A1 * | 6/2004 | Porter et al. ................. 280/291 |
| 2004/0154274 A1 * | 8/2004 | Samejima et al. ............. 56/1 |
| 2005/0108999 A1 * | 5/2005 | Bucher ..................... 56/10.2 R |
| 2005/0217230 A1 * | 10/2005 | Bucher ..................... 56/10.2 R |
| 2007/0163221 A1 * | 7/2007 | Foster ....................... 56/13.7 |

* cited by examiner

*Primary Examiner*—Árpád Fábián-Kovács
(74) *Attorney, Agent, or Firm*—James W. Miller

(57) ABSTRACT

A mower includes a zero turn radius (ZTR) traction unit carrying a front mounted cutting deck. The cutting deck is suspended beneath a carrier frame by a height of cut adjustment system comprising a plurality of pivot links and suspension chains extending between the carrier frame and the cutting deck. A hydraulic cylinder coupled to one of the pivot links can simultaneously lift the chains or permit the chains to lower to change the height of the cutting deck relative to the carrier frame. This same cylinder can also fold the carrier frame and the cutting deck relative to the traction unit about a fold pivot axis when a fold latch is selectively released by the operator. The carrier frame includes a center step for helping the operator mount or dismount the traction unit. The center step has a front viewport for allowing an operator who is seated on the traction unit to view the front edge of the cutting deck.

11 Claims, 15 Drawing Sheets

FRONT ROTARY CUTTING DECK HAVING CENTER STEP WITH FRONT VIEWPORT

CROSS REFERENCE TO RELATED APPLICATIONS

This application is a division of application Ser. No. 11/436,385 filed May 18, 2006 now U.S. Pat. No. 7,451,586.

TECHNICAL FIELD

This invention relates to a rotary cutting deck for a mower. More particularly, this invention relates to a front mounted rotary cutting deck on a lawn mower.

BACKGROUND OF THE INVENTION

Mowers are known for cutting grass that comprise a traction unit with a front mounted rotary cutting deck in advance of the traction unit. Such mowers are relatively long when compared with mowers in which the cutting deck is mounted under the belly of the mower. In addition, such mowers typically have the cutting deck suspended or carried from a front carrier frame. Thus, it can be difficult to service the cutting deck or to transport or store the mower when the cutting deck is attached to the traction unit.

Some mowers permit the carrier frame and cutting deck to be folded up relative to the traction unit while still attached to the traction unit. This exposes the underside of the cutting deck for service and reduces the front to back length of the mower for easier storage. However, the mechanisms previously used to fold the carrier frame and cutting deck are unduly complicated and often add substantial expense to the mower. It would be an advance in the art to find a simple, durable and inexpensive way to fold a carrier frame and a cutting deck up relative to a traction unit.

In some mowers of this type, the mower is further elongated by the need for the operator to mount or dismount from the operator's seat. This is often done by having the operator climb up onto the seat from behind the front wheels of the mower. It would be desirable for the operator to be able to mount or dismount from over the front mounted cutting deck, but known mowers of this type do not easily permit this.

SUMMARY OF THE INVENTION

One aspect of this invention relates to a mower for cutting grass. The mower comprises a traction unit having a prime mover. The traction unit is supported for rolling over the ground by a plurality of wheels at least one of which is a drive wheel for propelling the traction unit over the ground. A carrier frame extends forwardly from the traction unit for carrying a cutting deck having at least one rotary blade for cutting grass. At least a portion of the carrier frame overlies at least a portion of the cutting deck. A step surface is provided on the overlying portion of the carrier frame to help an operator mount or dismount from the traction unit by stepping onto the carrier frame.

Another aspect of this invention comprises a traction unit having a prime mover and a seat for carrying a seated operator. The traction unit is supported for rolling over the ground. A carrier frame has a pair of forwardly extending arms. Each arm carries a rotatable, ground engaging front wheel. A cutting deck has at least one rotary blade for cutting grass. The cutting deck is carried by the carrier frame with the forwardly extending arms of the carrier frame passing over the cutting deck and with the front wheels on the arms of the carrier frame being located ahead of adjacent portions of a front edge of the cutting deck. A step surface is located between the forwardly extending arms of the carrier frame in advance of the seat to allow the operator to mount or dismount the seat by stepping onto the step surface to approach the seat. The step surface extends far enough forwardly relative to the carrier frame such that a front portion of the step surface blocks the view of the operator of a portion of the front edge of the cutting deck between the ground engaging wheels when the operator is seated on the seat. A viewport is provided in the step surface to allow the operator when seated on the seat to see through the step surface and observe the portion of the front edge of the cutting deck that would otherwise have been blocked to the operator's view by the front portion of the step surface.

BRIEF DESCRIPTION OF THE DRAWINGS

This invention will be described more completely in the following Detailed Description, when taken in conjunction with the following drawings, in which like reference numerals refer to like elements throughout.

DETAILED DESCRIPTION

Figure 1:
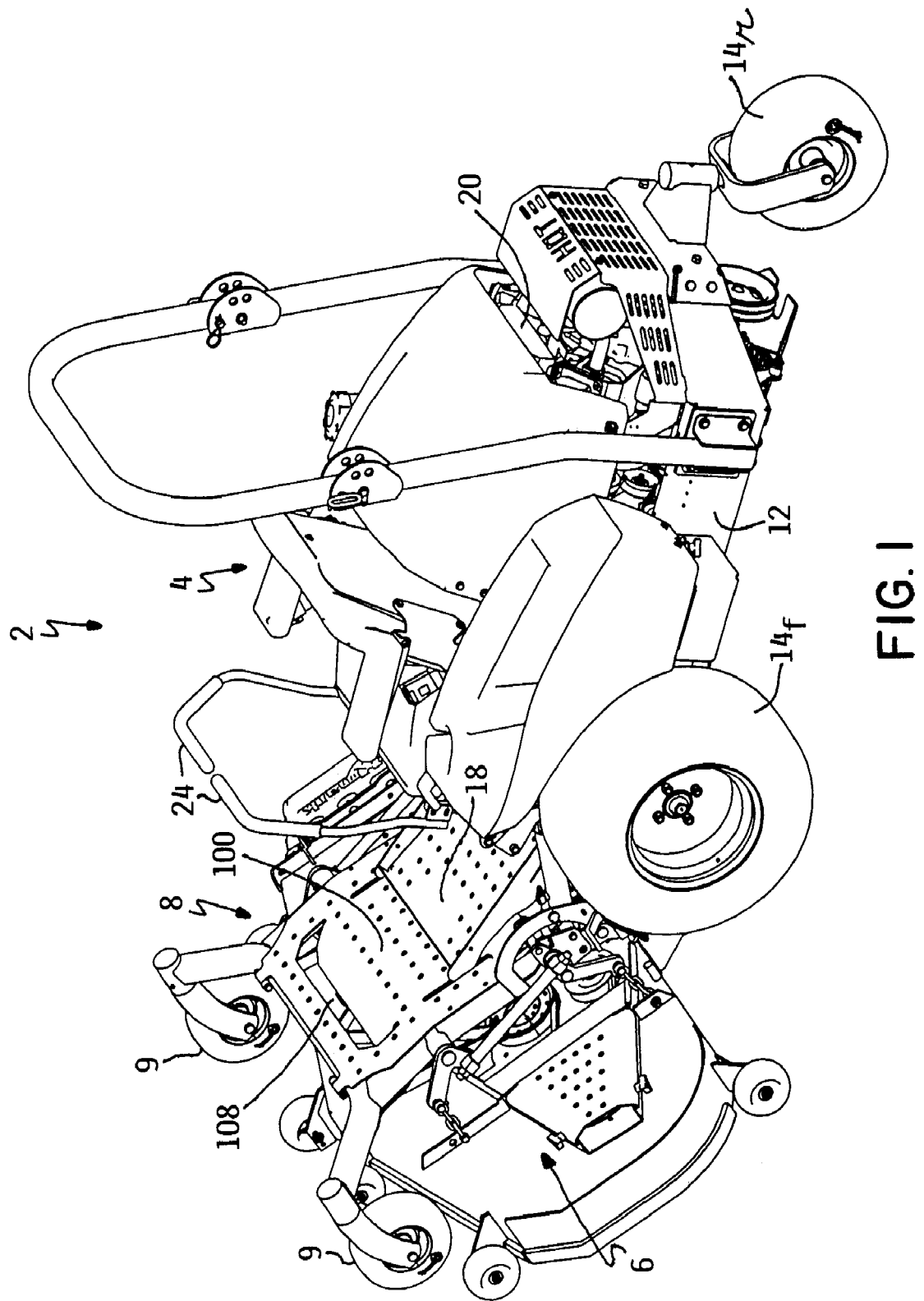
FIG. 1 is a perspective view from behind and from the left side of a mower according to this invention, particularly illustrating the cutting deck having been folded up relative to the traction unit into a service or storage position.
Figure 2:
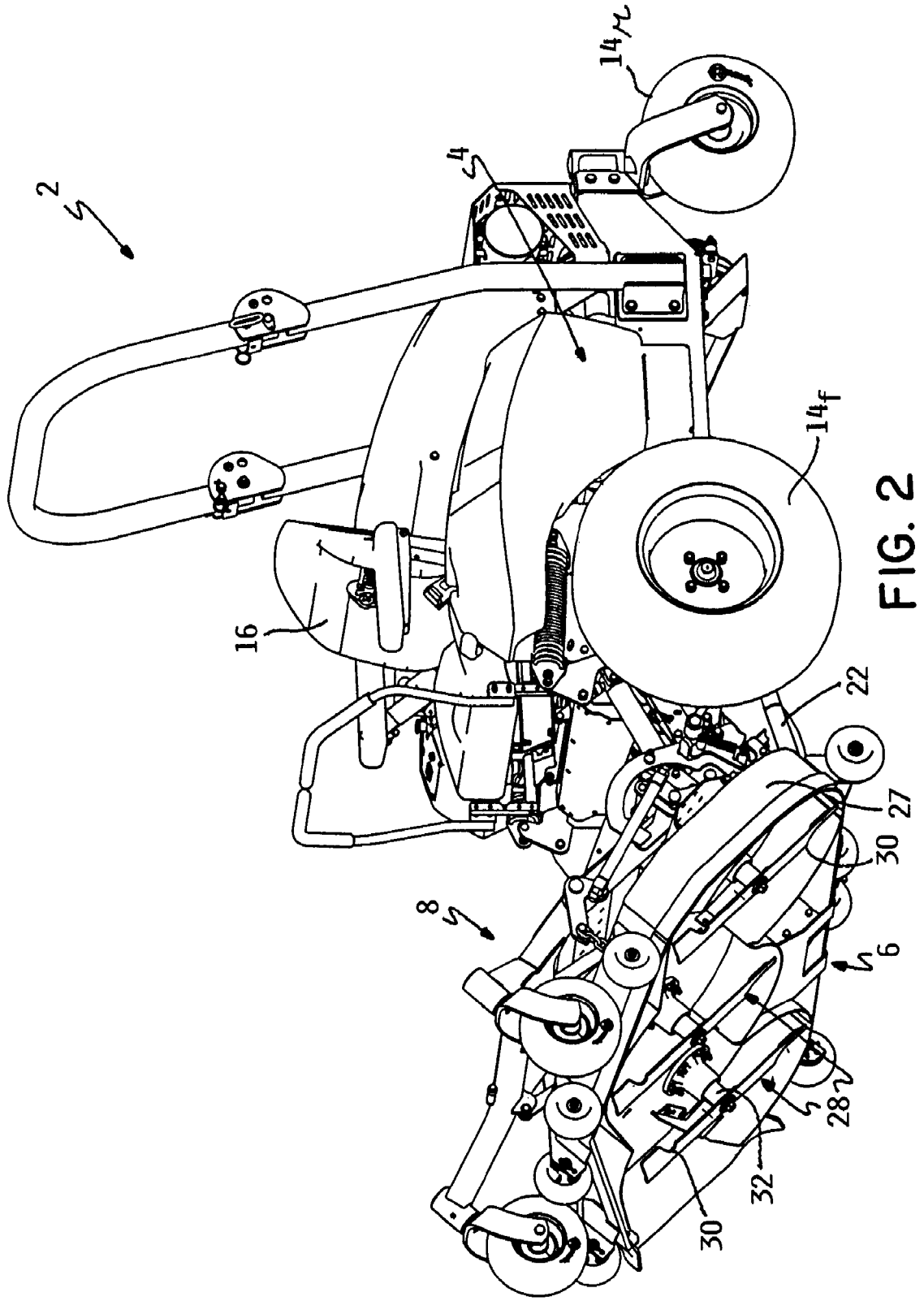
FIG. 2 is a perspective view similar to FIG. 1 from ahead of and from the left side of the mower shown in FIG. 1.
Figure 3:
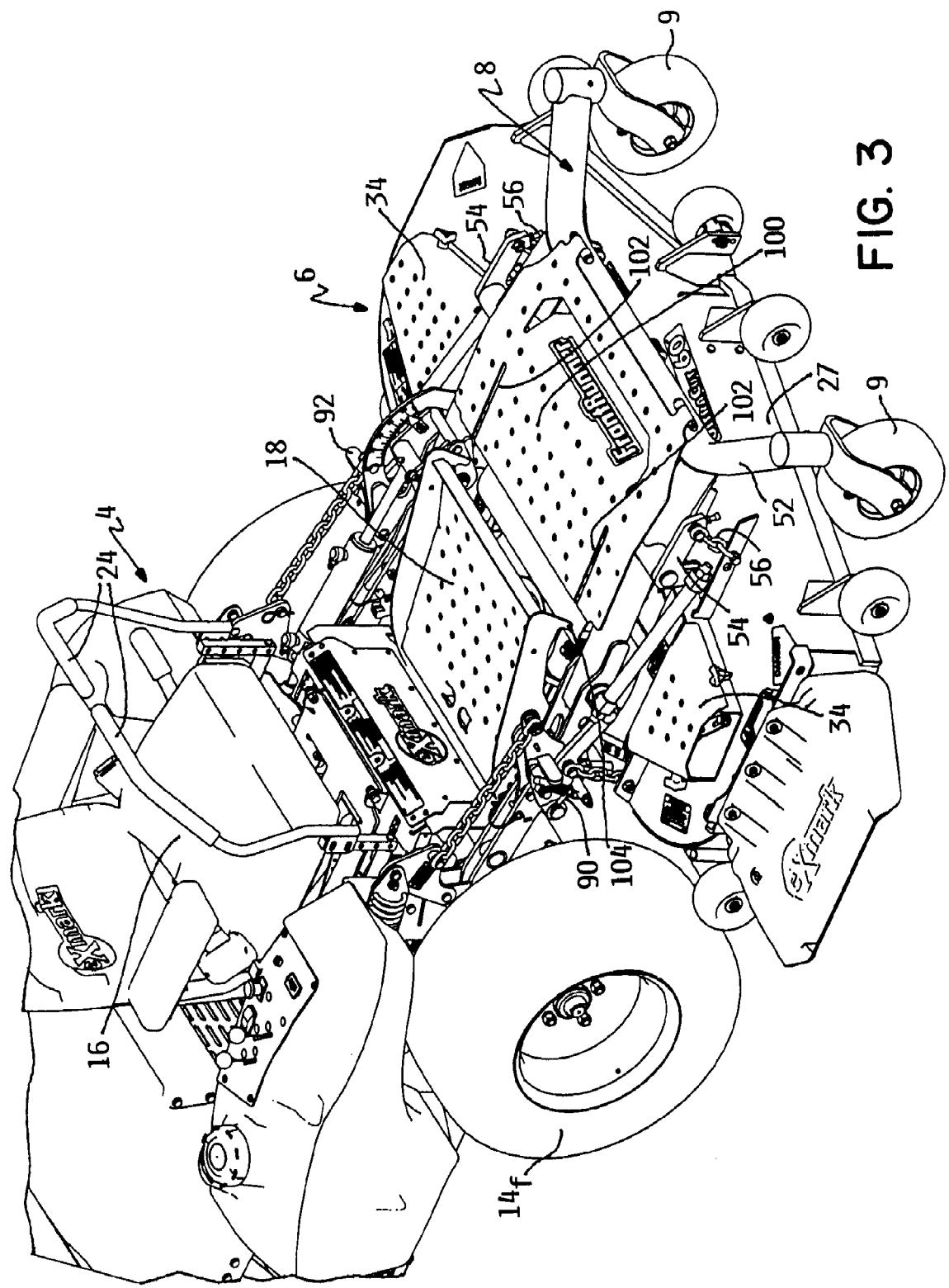
FIG. 3 is a perspective view of the mower of FIG. 1 from ahead of and from the right side of the mower shown in FIG. 1, particularly illustrating the cutting deck having been unfolded relative to the traction unit and disposed in a generally horizontal mowing position.

A preferred embodiment of a mower 2 according to this invention comprises a traction unit 4 and a rotary cutting deck 6 mounted in front of traction unit 4. Cutting deck 6 is suspended from a carrier frame 8 that is separate from traction unit 4. In turn, carrier frame 8 is coupled to the front of traction unit 4 by a hitch assembly 10.

The Traction Unit

Traction unit 4 is self-propelled and self-supporting. A preferred embodiment of traction unit 4 comprises a traction frame 12 supported for rolling over the ground by a plurality of ground engaging wheels 14. The wheels comprise a pair of relatively large front drive wheels 14f at the front of traction frame 12 and a smaller rear caster wheel 14r at the rear of traction frame 12. Front and rear wheels 14f and 14r are arranged in a tricycle configuration.

The front of traction unit 4 comprises an operator's station. The operator's station includes a seat 16 on traction frame 12 located between front wheels 14f carrying a seated operator. In addition, a pivotal floor pan 18 is provided on traction frame 12 for supporting the feet of the operator as the operator sits on seat 16.

A prime mover 20 is carried on traction frame 12 behind seat 16. Prime mover 20 rotates front drive wheels 14f in forward or reverse through any suitable traction system (not shown). Prime mover 20 also powers a forwardly extending power takeoff shaft 22 (PTO) used to supply power for cutting the grass, as will be described hereafter.

Preferably, traction unit 4 comprises a Zero Turn Radius (ZTR) traction unit in which the front drive wheels 14f are differentially controlled to steer traction unit 4. Twin stick control levers 24 are provided on traction frame 12 in front of seat 16 to permit the operator such differential control. For example, pushing the right stick 24 further forwardly than the left stick 24 will cause the right drive wheel 14f to rotate faster than the left drive wheel 14f, thus causing traction frame 12 to turn to the left. Such ZTR traction units 4 and twin stick control levers 24 are well known in the mower art and need not be further described herein.

While a ZTR traction unit is a preferred embodiment for traction unit 4, other traction units including non-ZTR traction units could be used. In addition, a three or four wheel traction unit could comprise traction unit 4 with four wheels being arranged on traction frame 12 in a non-tricycle configuration. The drive to the wheels could be an all wheel drive where each wheel is driven or wheels other than the front wheels could be driven. Alternatively, traction unit 4 could comprise a walk-behind traction unit having a rearwardly extending handle assembly that is gripped by an operator who walks on the ground behind traction unit 4.

The Cutting Deck

Deck 6 has a top wall 26 and a downwardly extending peripheral wall 27 that forms a plurality of cutting chambers 28. A rotary cutting blade 30 is housed within each cutting chamber 28 and rotates in a substantially horizontal cutting plane about a substantially vertical axis. Each blade is powered by a rotary spindle 32 that extends upwardly with a top end of the spindle being located above the top wall of deck 6. There, the spindle may be rotated by any suitable drive, such as a belt drive powered by PTO shaft 22 of traction unit 4. Rotary cutting decks of this type are well known in the mower art.

The belt drive system for blade spindles 32 is normally covered by a belt cover to prevent contact between the belt drive system and a person such as the operator. In deck 6 of mower 2 of this invention, lateral portions of the belt cover lie outside of carrier frame 8 on either side of carrier frame 8. These lateral portions of the belt cover are formed to be strong enough to serve as side steps 34 for helping an operator mount and dismount from seat 16. In this respect, the lateral portions of the belt cover are provided with a textured upper surface formed by a plurality of slightly raised dimples 36 to provide a better grip to the operator's shoes as the operator mounts and dismounts traction unit 4.

The Hitch Assembly

Figure 4:
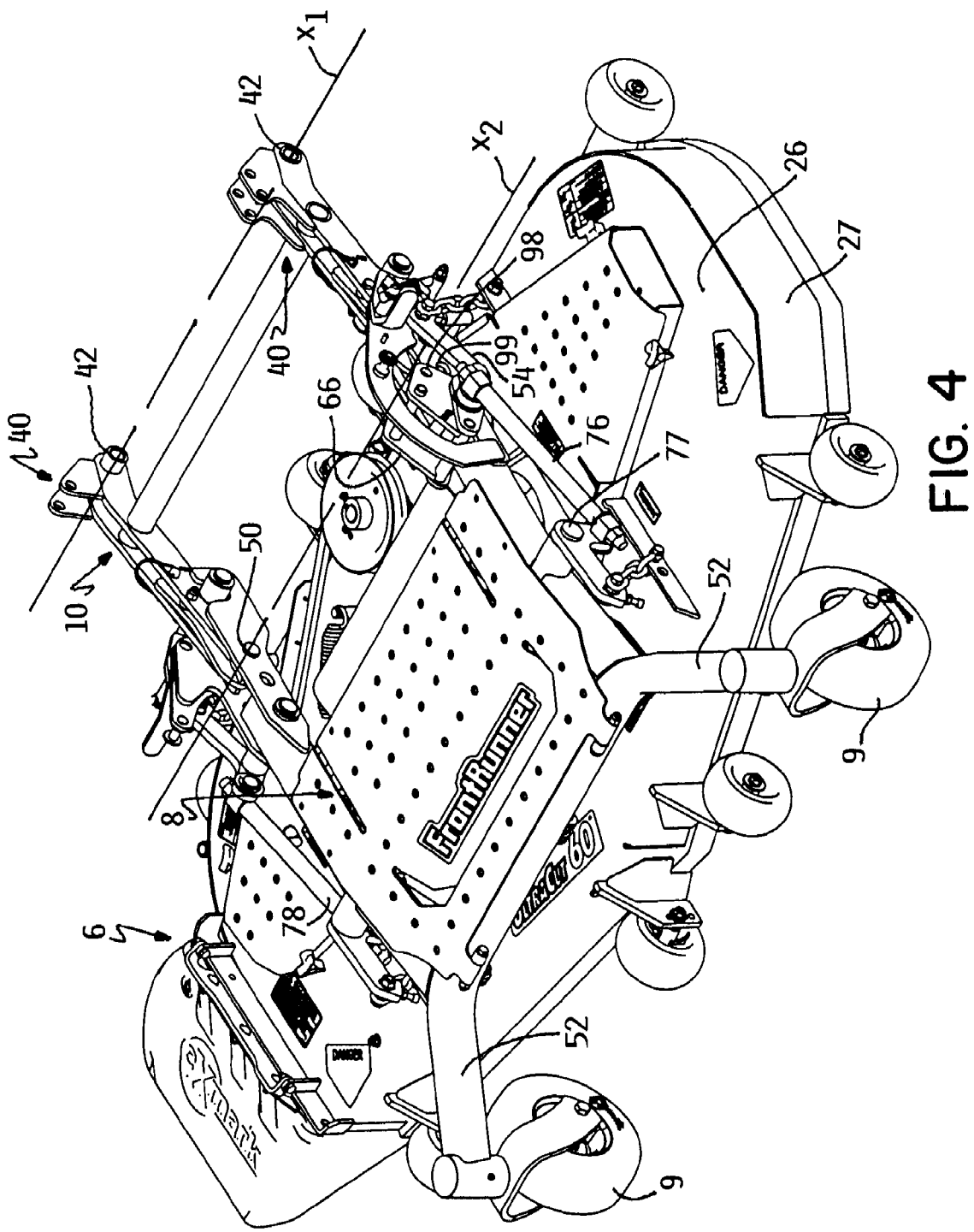
FIG. 4 is a perspective view of the cutting deck, the carrier frame from which the cutting deck is suspended, and the hitch assembly that connects the carrier frame to the traction unit.
Figure 5:
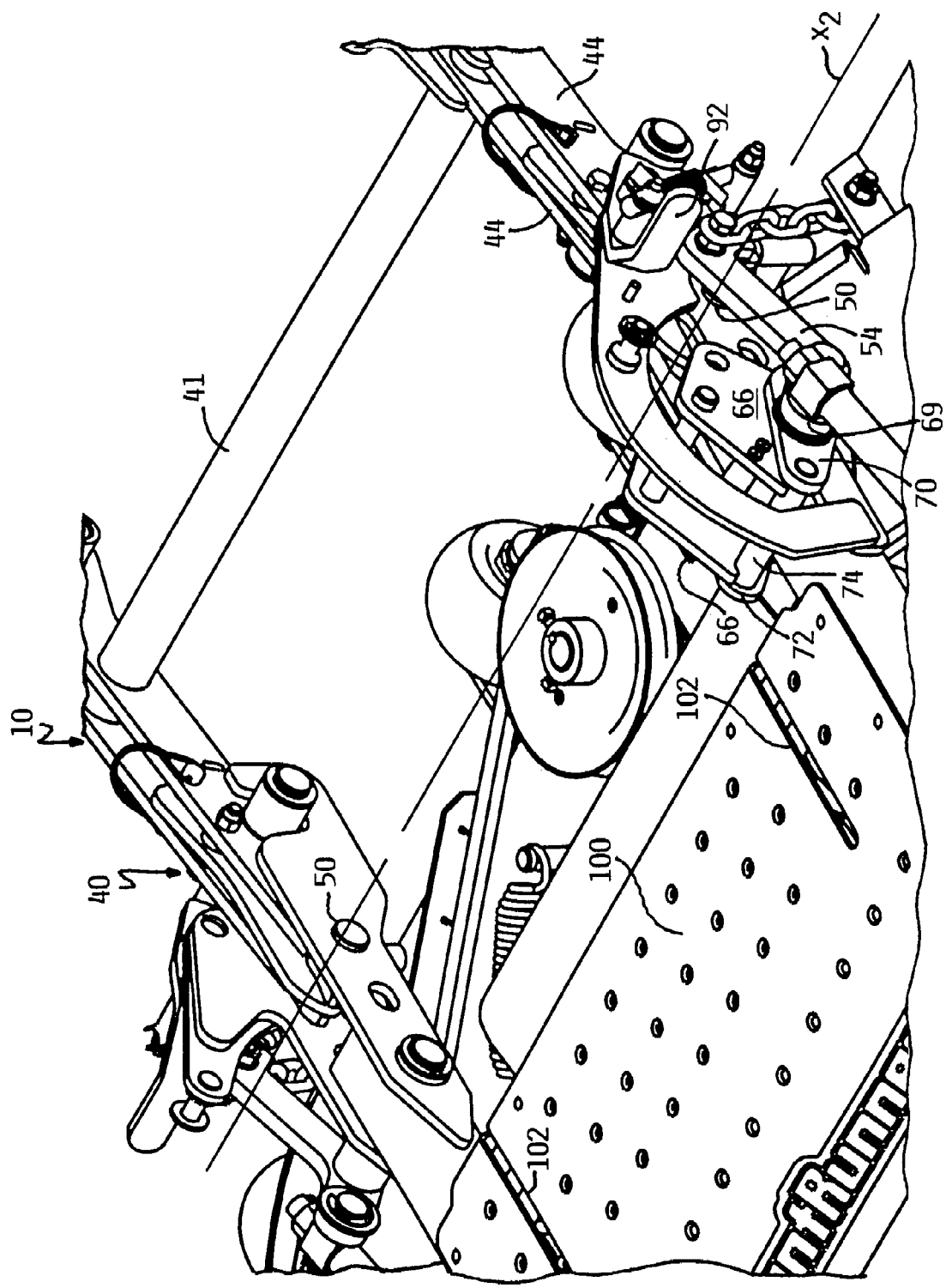
FIG. 5 is an enlarged perspective view of a portion of FIG. 4, particularly illustrating the rear of the carrier frame and its connection to the front of the hitch assembly.

Referring now to FIGS. 4 and 5, hitch assembly 10 connects carrier frame 8 to traction unit 4. Hitch assembly 10 is generally U-shaped comprising left and right hitch arms 40 connected together by a rear, transverse cross rod 41. Hitch assembly 10 pivots on traction unit 4 about a substantially horizontal, ground following pivot axis x1. The ground following pivot axis x1 is defined by a pair of aligned, transversely extending pivots 42 on hitch arms 40, with pivot 42 on the right hitch arm 40 of mower 2 being shown in FIG. 4.

When carrier frame 8 and deck 6 are coupled to hitch assembly 10 and mower 2 is being used to cut grass, deck 6 can pitch upwardly and downwardly in opposite directions about the ground following pivot axis x1 to follow the ground contours. Front support wheels 9 of carrier frame 8 always remain in contact with the ground during a mowing operation. Thus, carrier frame 8 will pivot about the ground following pivot axis x1 to accommodate short undulations or bumps in the terrain. For example, when front support wheels 9 of carrier frame 8 ride up a short rise, carrier frame 8 and deck 6 carried thereby will pivot upwardly about the ground following pivot axis 1 to follow the rise even when traction unit 4 is still on level ground.

Figure 16:
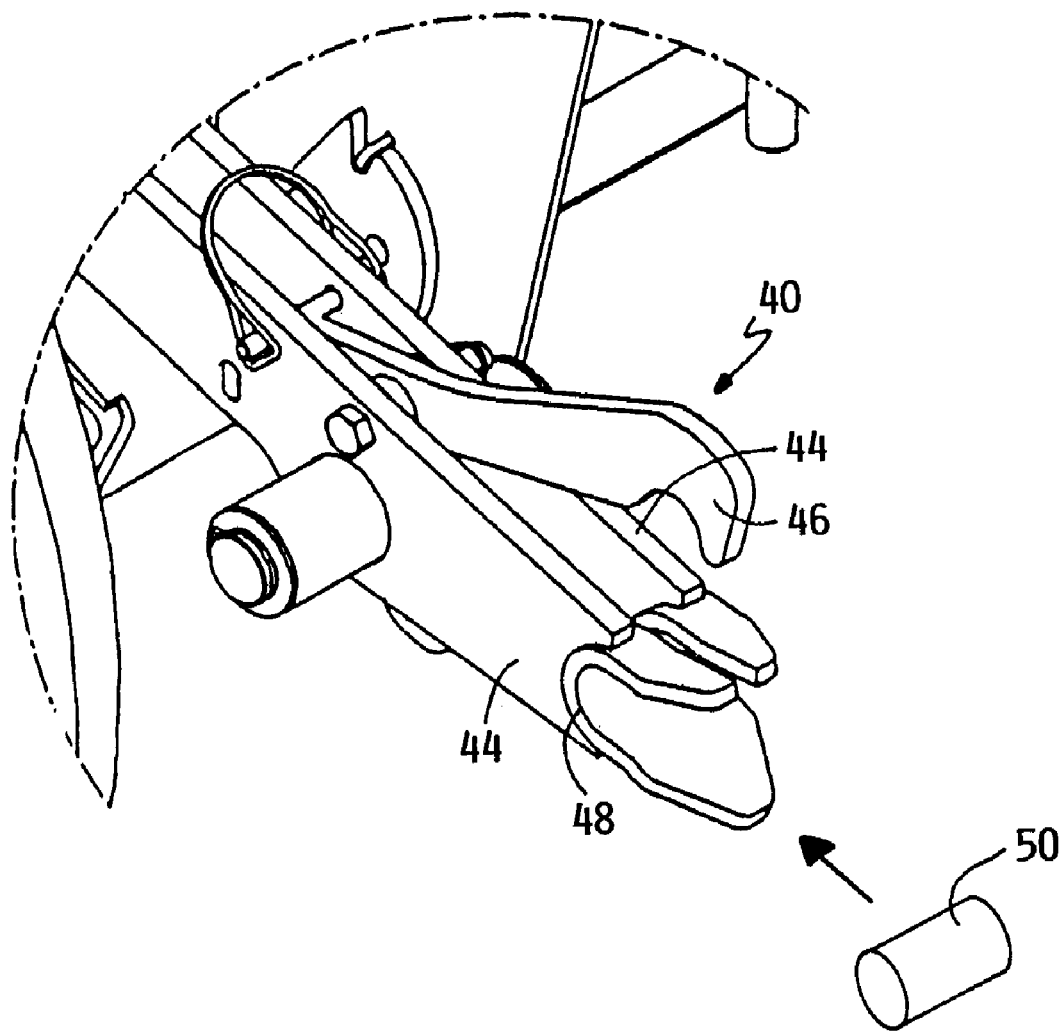
FIG. 16 is a perspective view of the front end of one of the hitch arms of the hitch assembly, particularly illustrating how the hitch arm is releasably coupled to a fold pivot carried on the rear of the carrier frame.

Referring now to FIG. 16, hitch arms 40 could comprise solid arms, but preferably each hitch arm 40 is a bifurcated arm formed by a pair of spaced, parallel plates 44. These plates form a channel in which a pivotal latch hook 46 is received. The front of hitch arm 40 carries a semi-circular, forwardly facing socket 48 which is adapted to receive a fold pivot 50 on the rear of carrier frame 8. When fold pivot 50 is received in socket 48, latch hook 46 can be dropped down to capture fold pivot 50 within socket 48. Fold pivot 50 and its capture within socket 48 form an easy and simple way both of coupling carrier frame 8 to hitch assembly 10 as well as permitting carrier frame 8 to be folded relative to hitch assembly 10 by the rotation of fold pivot 50 within socket 48 as described hereafter.

Identical fold pivots 50 are provided on opposite sides of carrier frame 8 with the fold pivots 50 being aligned relative to one another. Together, the two fold pivots 50 are each received in sockets 48 on the pair of hitch arms 40 to couple carrier frame 8 to hitch assembly 10. The two fold pivots 50 define a transversely extending fold pivot axis $x2$.

The Carrier Frame

Carrier frame 8 includes a pair of ground engaging, front caster wheels 9. This allows carrier frame 8 to roll over the ground as carrier frame 8 is propelled by traction unit 4. Caster wheels 9 are carried on outrigger arms 52 at the front of carrier frame 8. Deck 6 is itself suspended from carrier frame 8 behind caster wheels 9.

A height of cut adjustment system is provided on carrier frame 8. The height of cut adjustment system is a conventional pivot link/suspension chain system in which four pivot links 54 are pivotally carried on carrier frame 8. Four suspension chains 56 extend downwardly from pivot links 54 to deck 6. Thus, deck 6 is suspended by chains 56 from pivot links 54 at four spaced points.

Figure 6:
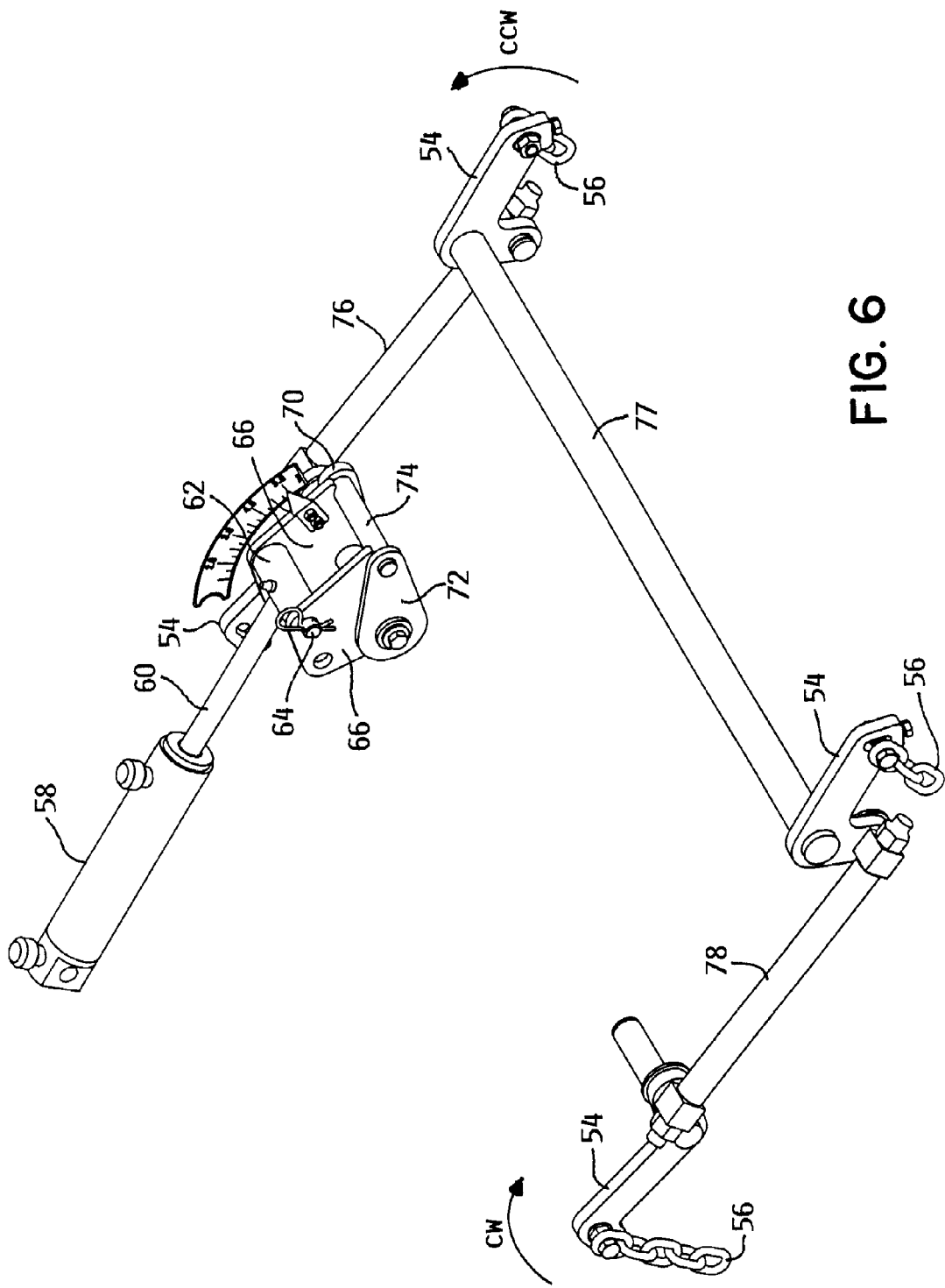
FIG. 6 is a perspective view of a portion of the mower of FIG. 1, particularly illustrating the height of cut adjustment system configured to provide a maximum height of cut.
Figure 7:
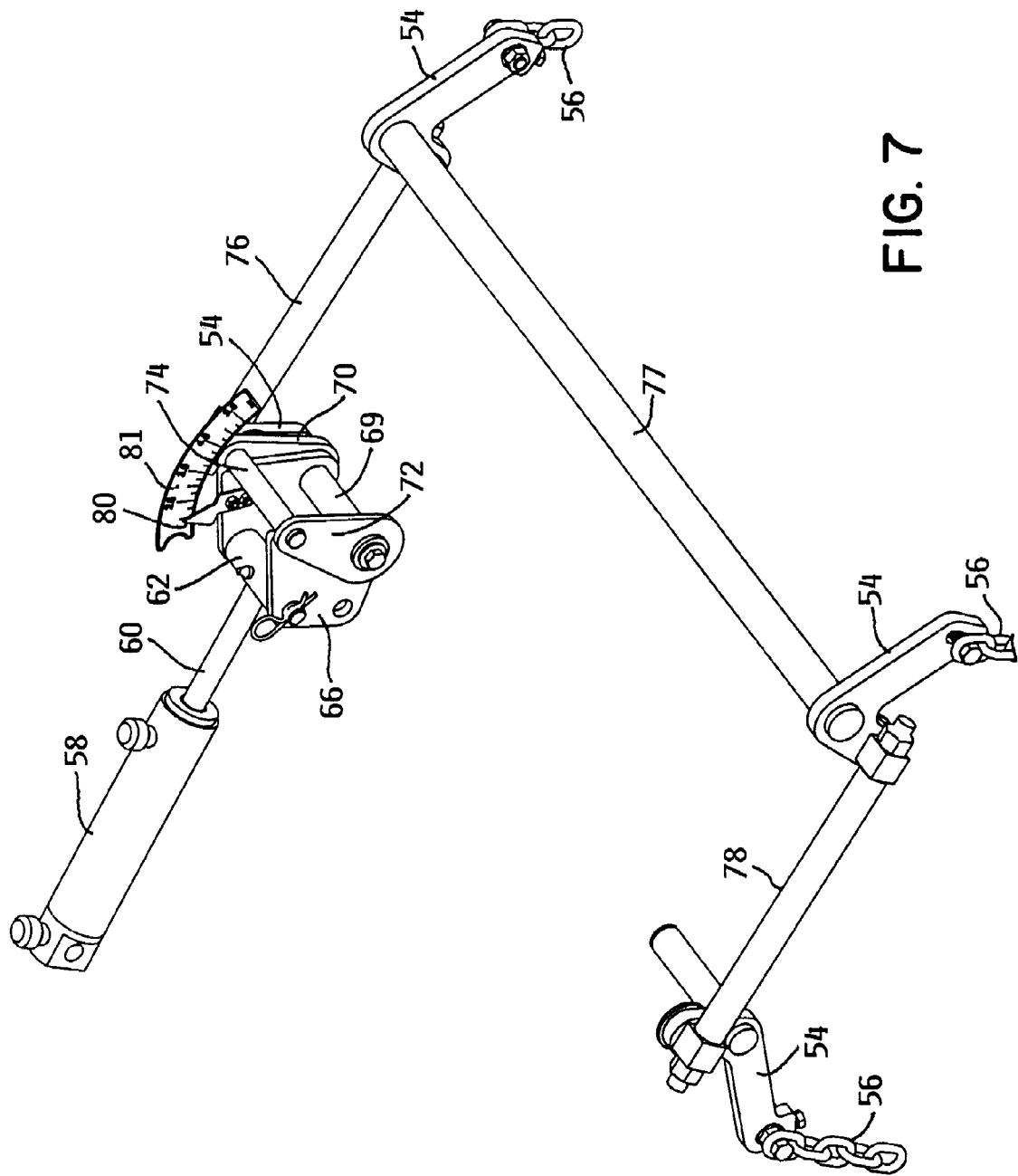
FIG. 7 is a perspective view similar to FIG. 6, but showing the height of cut adjustment system configured to provide a minimum height of cut.

Pivot links 54 are pivoted in one direction or the other to raise or lower deck 6 to effect a change in the height of cut. Referring to FIG. 6, pivoting the front pivot links 54 in a counter-clockwise direction CCW and the rear pivot links 54 in a clockwise direction CW pulls up on chains 56 to raise deck 6 relative to carrier frame 8 to increase the height of cut. Conversely, referring to FIG. 7, pivoting all of the links 54 in opposite directions to those in FIG. 6 allows deck 6 to drop and chains 56 to lower. This lowers deck 6 relative to carrier frame 8 to decrease the height of cut.

A hydraulic cylinder 58 is part of the height of cut adjustment system and sets or establishes the positions of pivot links 54. Cylinder 58 is pivotally carried on hitch assembly 10. Piston rod 60 of cylinder 58 extends forwardly from cylinder 58. The forward end of piston rod 60 has a transverse connecting hub 62 that is pivotally journalled on a pivot pin 64 extending between a pair of spaced float links 66. Float links 66 pivot around the pivot 69 that pivotally journals the left rear pivot link 54 to carrier frame 8. See FIG. 5.

The left rear pivot link includes a first upwardly extending ear 70 that is fixed to the left rear pivot link and that extends upwardly adjacent one float link 66. A second upwardly extending ear 72 is pivotally journalled on pivot 69 and extends upwardly adjacent the opposite float link 66. The ears 70 and 72 are joined together at the top by a pin 74. Thus, the left rear pivot link 54, the ears 70 and 72, and the pin 74 pivot as a unit about the same pivot 69 on which float links 66 pivot, but they do so independently.

When piston rod 60 is extended out of cylinder 58, the front edges of float links 66, which bear against pin 74, push forwardly on pin 74 to rotate the left rear pivot link in the direction which lifts chains 56 to raise deck 6. The left rear pivot link is, in turn, connected to the left front pivot link by a left connecting rod 76, the left front pivot link is connected to the right front pivot link by a transverse connecting shaft 77, and the right front pivot link is connected to the right rear pivot link by a right connecting rod 78. Thus, all four pivot links 54 rotate simultaneously in the appropriate directions to simultaneously lift the four suspension chains 56 when piston rod 60 is extended forwardly to rotate the left rear pivot link 54.

Piston rod 60 must be positively powered to extend piston rod 60 out of cylinder 58 to increase the height of cut as piston rod 60 must overcome the weight of deck 6 acting downwardly on chains 56. However, to decrease the height of cut, the pressure forcing piston rod 60 out of cylinder 58 need only be relieved. The weight of deck 6 acting on chains 56 will permit deck 6 to lower under the force of gravity alone, thereby reversely rotating pivot links 54 and causing pin 74 to push rearwardly against float links 66. This will thus indirectly push rearwardly on bracket 68 to move bracket 68 and piston rod 60 in the reverse direction in accordance with the amount by which the holding pressure in cylinder 58 was relieved.

One float link 66 carries an upwardly extending indicator 80 which can be read against a scale 81 that is fixed to carrier frame 8. Indicator 80 and scale 81 illustrate in inches the height of cut of deck 6, i.e. when indicator 80 points to the 2 on scale 81 then deck 6 will provide a 2 inch height of cut, when indicator 80 points to the 3 on scale 81 then deck 6 will provide a 3 inch height of cut, etc.

Indicator 80 and scale 81 are visible to the operator when the operator is seated on seat 16 of mower 2. Thus, the operator can select whatever height of cut is required by controlling the extension and retraction of piston rod 60 out of or into cylinder 58 using a suitable control placed adjacent seat 16. Hydraulic pressure is supplied to the hydraulic cylinder using a hydraulic supply system (not shown) carried on traction unit 4. A hydraulic pump (not shown) in the hydraulic supply system is powered by prime mover 20 of traction unit 4.

Each side of carrier frame 8 has an upwardly facing latch seat 82. Each latch seat 82 is shaped to receive a laterally extending latch pin 84 carried on one hitch arm 40 of hitch assembly 10. During normal mowing operations, each latch pin 84 on each hitch arm 40 is received in a corresponding latch seat 82 provided on one side of carrier frame 8. See FIG. 5 which shows one such latch pin 84 received in latch seat 82 on the right side of carrier frame 8.

A pair of pivotal fold latches 86 is provided on carrier frame 8 with one fold latch 86 being located adjacent each latch pin 84. The purpose of fold latches 86 is to lock or latch each latch pin 84 in its respective latch seat 82 on carrier frame 8. When this is done, carrier frame 8 and hitch assembly 10 are rigidly locked relative to one another such that carrier frame 8 can no longer pivot about fold pivot axis $x2$. The only pivotal motion then allowed for carrier frame 8, and thus for deck 6 carried by carrier frame 8, is the pivotal motion of hitch assembly 10 about the ground following pivot axis $x1$ during a normal mowing operation. Carrier frame 8 can pivot in opposed directions about the ground following pivot axis $x1$ to allow deck 6 to pitch up or down as dictated by undulations in the ground.

Figure 8:
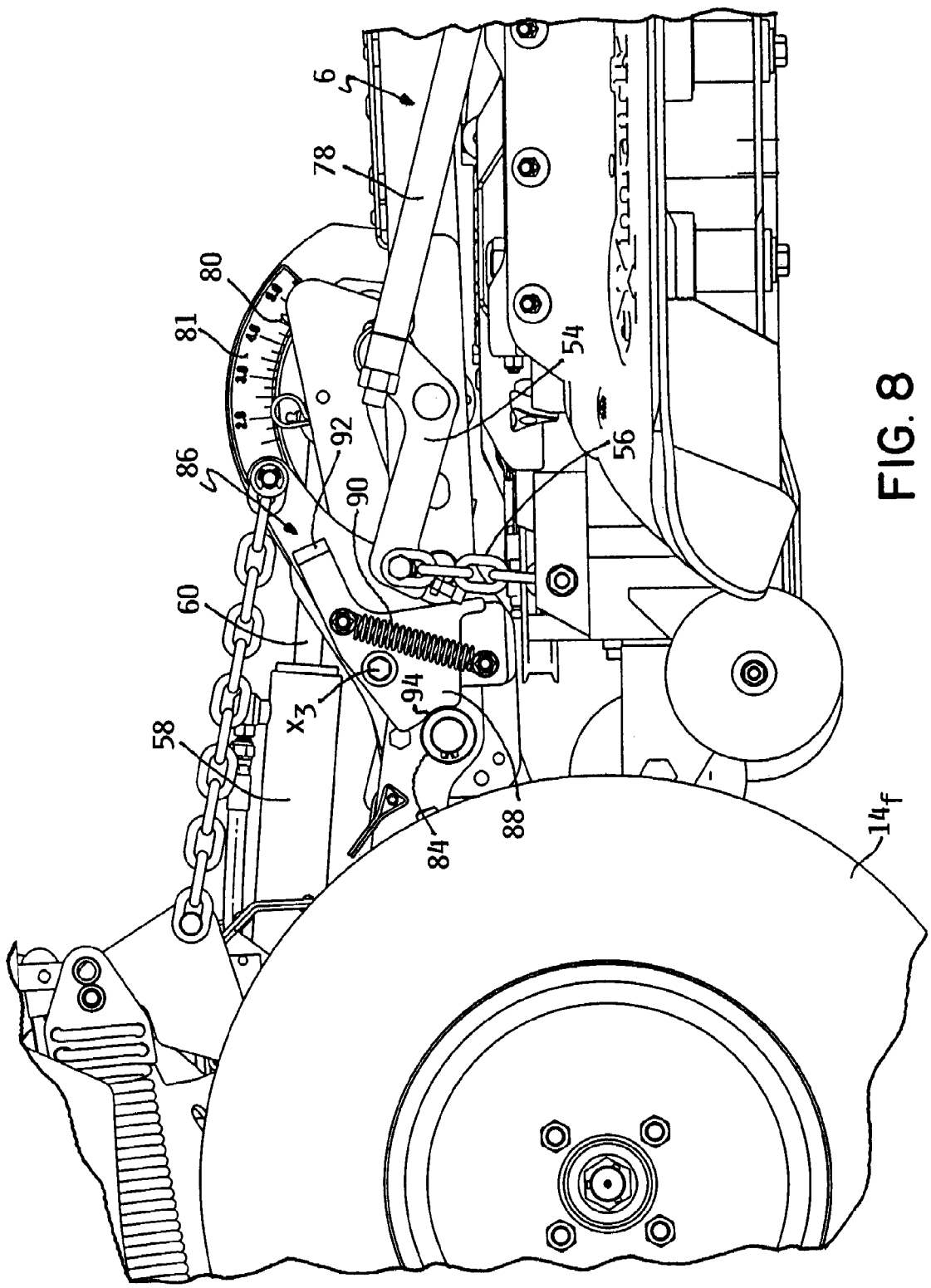
FIG. 8 is a side elevational view of a portion of the mower of FIG. 1, particularly illustrating the carrier frame latch in its latched position to lock the carrier frame relative to the hitch assembly to prevent the cutting deck from being folded up relative to the traction unit.
Figure 9:
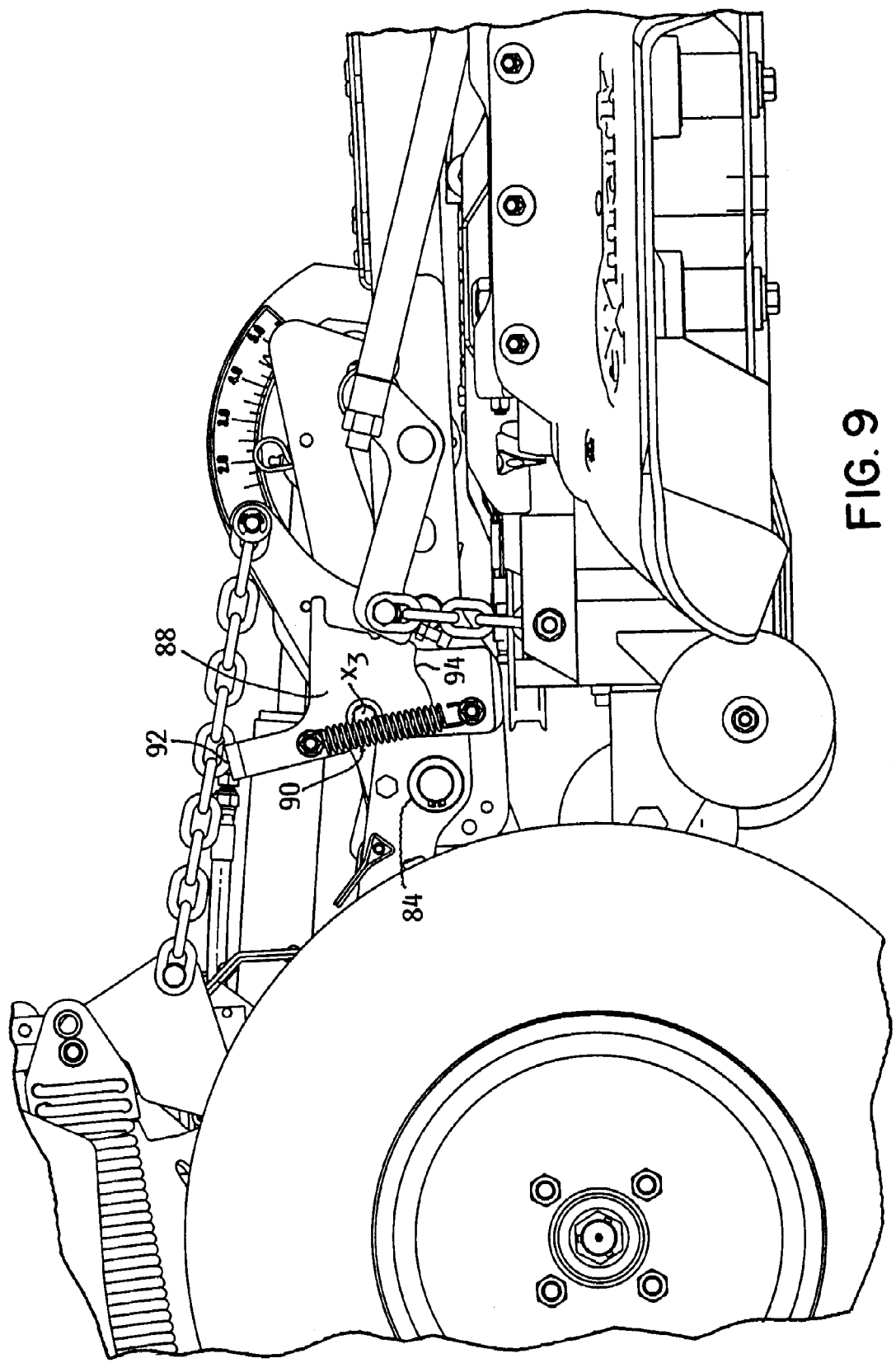
FIG. 9 is a side elevational view similar to FIG. 8, but particularly illustrating the carrier frame latch in its unlatched position to unlock the carrier frame relative to the hitch assembly to permit the cutting deck to be folded up relative to the traction unit but prior to the cutting deck having been folded up, namely with the cutting deck still disposed in its generally horizontal mowing position.

Each pivotal fold latch 86 comprises a latch plate 88 that is pivoted to one side of carrier frame 8 for rotation about a latch pivot axis $x3$. The top end of an overcenter spring 90 is connected to latch plate 88 ahead of the latch pivot axis $x3$. The rear end of the same overcenter spring 90 is connected to carrier frame 8 sufficiently behind the connection of the top end of spring 90 so that overcenter spring 90 holds latch plate 88 in one of two stable positions. The first position is a latched position as shown in FIG. 8. The second position is an unlatched position as shown in FIG. 9.

Latch plate 88 has a laterally extending handle 92 at its forward end. Handle 92 is gripped by the operator to pivot fold latch 86 between its latched and unlatched positions. The rear edge of latch plate 88 has a contoured detent 94 that is shaped to conform to the curvature of latch pin 84. When fold latch 86 is in its latched position, detent 94 on latch plate 88 abuts against latch pin 84 to prevent latch pin 84 from leaving latch seat 82. This is what locks up or rigidities carrier frame 8 relative to hitch assembly 10.

However, when fold latch 86 is in its unlatched position, detent 94 is pivoted away from latch pin 84 and clears latch pin 84. See FIG. 9. In this unlatched position, latch pin 84 is now free to move out of latch seat 82. Thus, carrier frame 8 is now free to pivot or fold relative to hitch assembly 10 about fold pivot axis x2.

The operator must unlatch the two fold latches 86 on the sides of carrier frame 8 in order to allow carrier frame 8 to pivot about fold pivot axis x2 to thereby fold up relative to hitch assembly 10. This is easiest to do when deck 6 is in its maximum height of cut adjustment on carrier frame 8, as shown in FIGS. 8 and 9. In this position, latch plates 88 are relatively unloaded relative to latch pins 84. The operator can, in fact, grab the handles on fold latches 86 and manually pivot latch plates 88 between their latched and unlatched positions. As noted above, in the unlatched positions of latch plates 88, latch pins 84 have been cleared by latch plates 88 and are free to move up out of latch seats 82.

After so unlatching carrier frame 8 relative to hitch assembly 10, the operator can now actuate the hydraulic cylinder to begin to positively retract piston rod 60 into cylinder 58. As piston rod 60 retracts, there will be a small amount of folding of carrier frame 8 as the height of cut adjustment system resets from its maximum height of cut position to its minimum height of cut position. However, once the minimum height of cut position is attained, float links 66 begin to separate from pin 74. Pin 74 and the pair of ears 70 and 72 which carry pin 74 can no longer follow float links 66 after the minimum height of cut position is reached.

Figure 12:
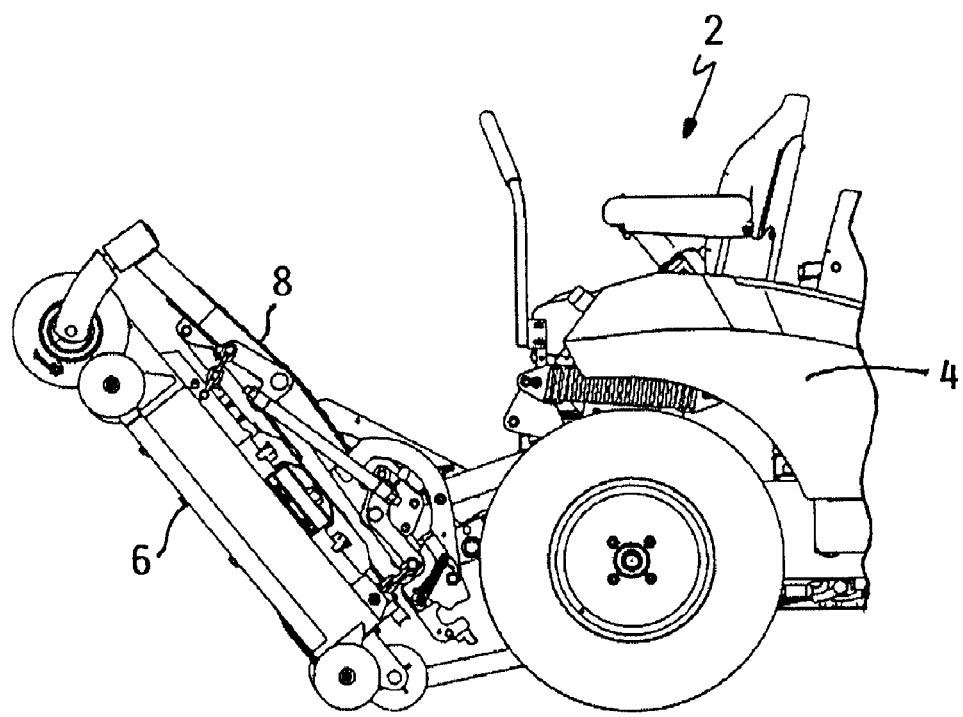
FIGS. 12 and 13 are side elevational views of the mower of FIG. 1, particularly illustrating the maximum amount the cutting deck can be folded in the service/storage position when the lock pin of FIG. 11 is not installed and is installed, respectively.

As piston rod 60 continues to be retracted into cylinder 58 with the separation between float links 66 and pin 74 continuing to grow, the connecting hub 62 on the front of piston rod 60 will abut against and bottom out on top of carrier frame 8. Then, continued retraction of piston rod 60 pulls directly on float links 66 to begin to quickly pivot or fold carrier frame 8 upwardly relative to hitch assembly 10 about fold pivot axis x2. Carrier frame 8 will now fold up approximately 50° until it reaches the first service/storage position shown in FIG. 12. However, carrier frame 8 will reach this first folded position before piston rod 60 is fully retracted. If one continues to retract piston rod 60, the geometry of the system is such that float links 66 now begin to move back in the other direction to start to unfold carrier frame 8.

Figure 11:
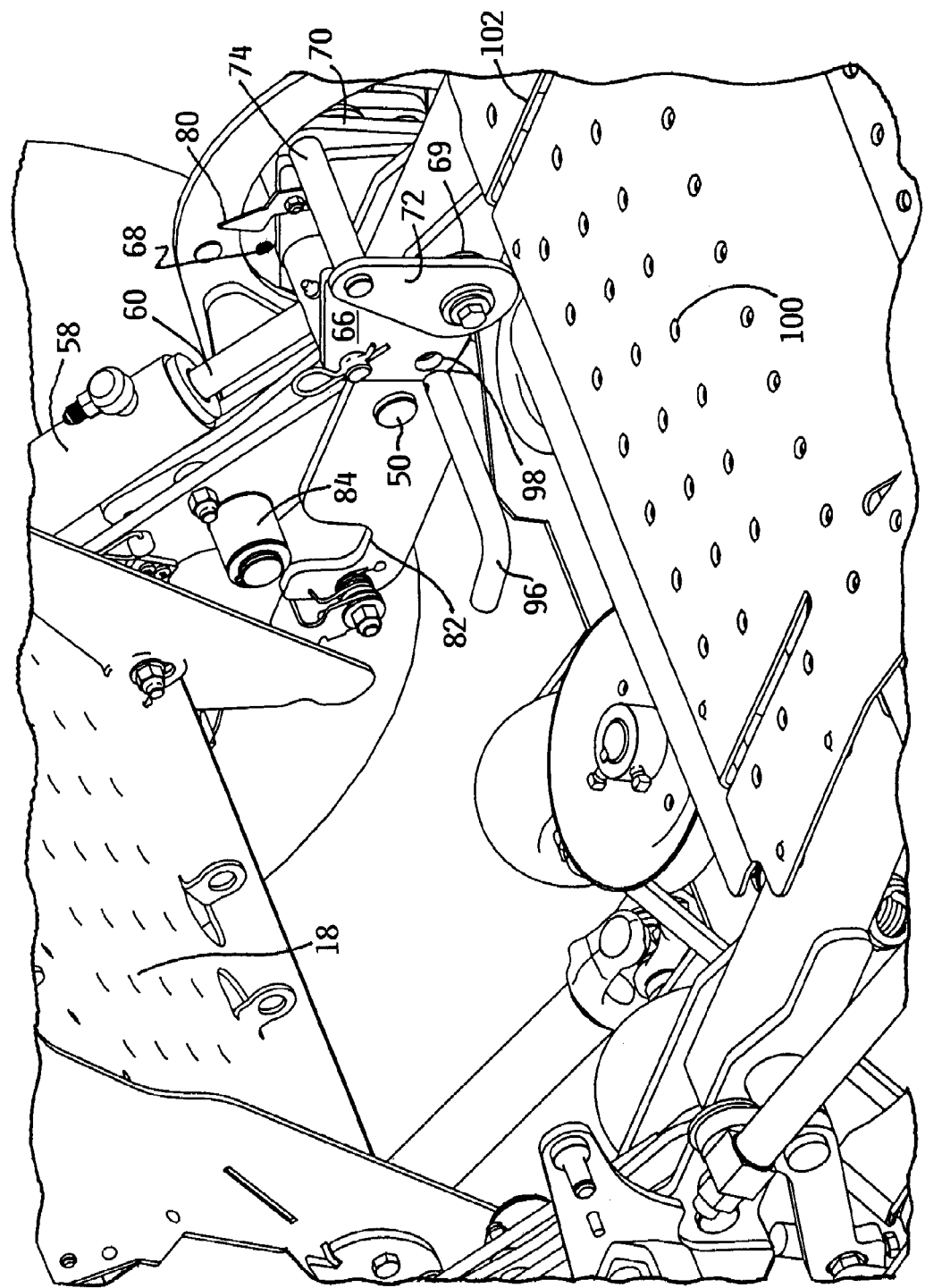
FIG. 11 is an enlarged perspective view of a portion of the mower of FIG. 1, particularly illustrating the floor pan of the operator's station having been pivoted upwardly to allow the insertion of a lock pin to lock the piston rod bracket to the carrier frame to obtain a maximum amount of folding when the cutting deck is disposed in its service/storage position.
Figure 13:
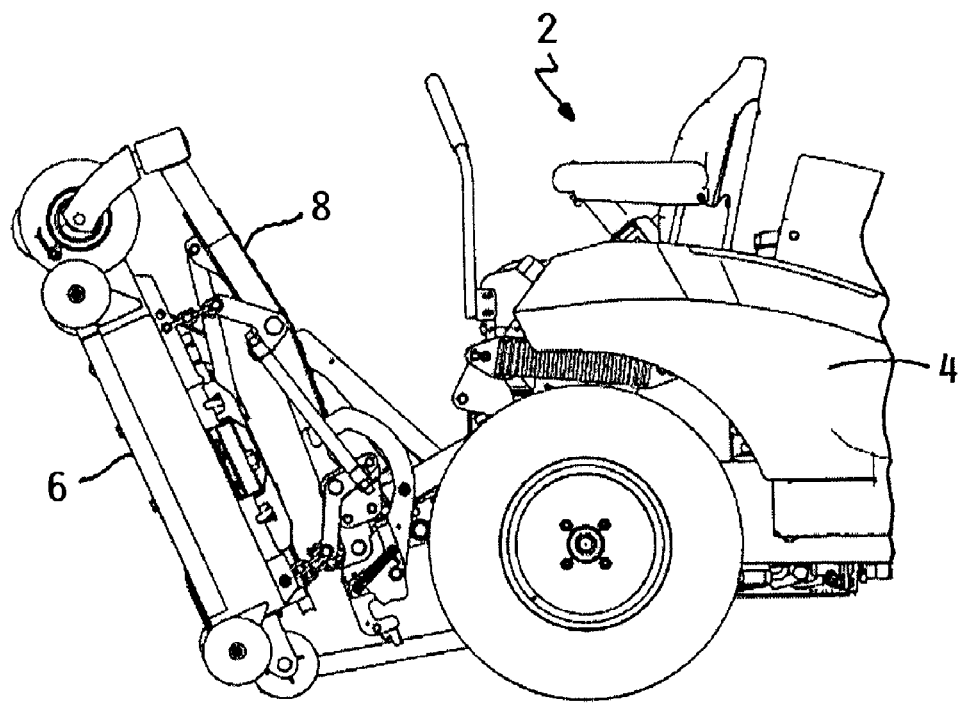

If the operator wishes to reach a second service/storage position in which carrier frame 8 has been folded approximately 70° as shown in FIG. 13, it is necessary for the operator to insert a full fold lock pin 96 into float links 66. See FIG. 11. Full fold lock pin 96 passes through an opening 98 in float links 66 which may be aligned with an opening 99 (shown in FIG. 4) in carrier frame 8. The purpose of full fold lock pin 96 is to lock float links 66 to carrier frame 8 and prevent any reverse rotation of float links 66 during the final stages of retraction of piston rod 60. Now, when piston rod 60 fully retracts, one gets the maximum amount of folding on carrier frame 8, thereby gaining approximately 20ø more folding than when full fold lock pin 96 is not used.

Figure 10:
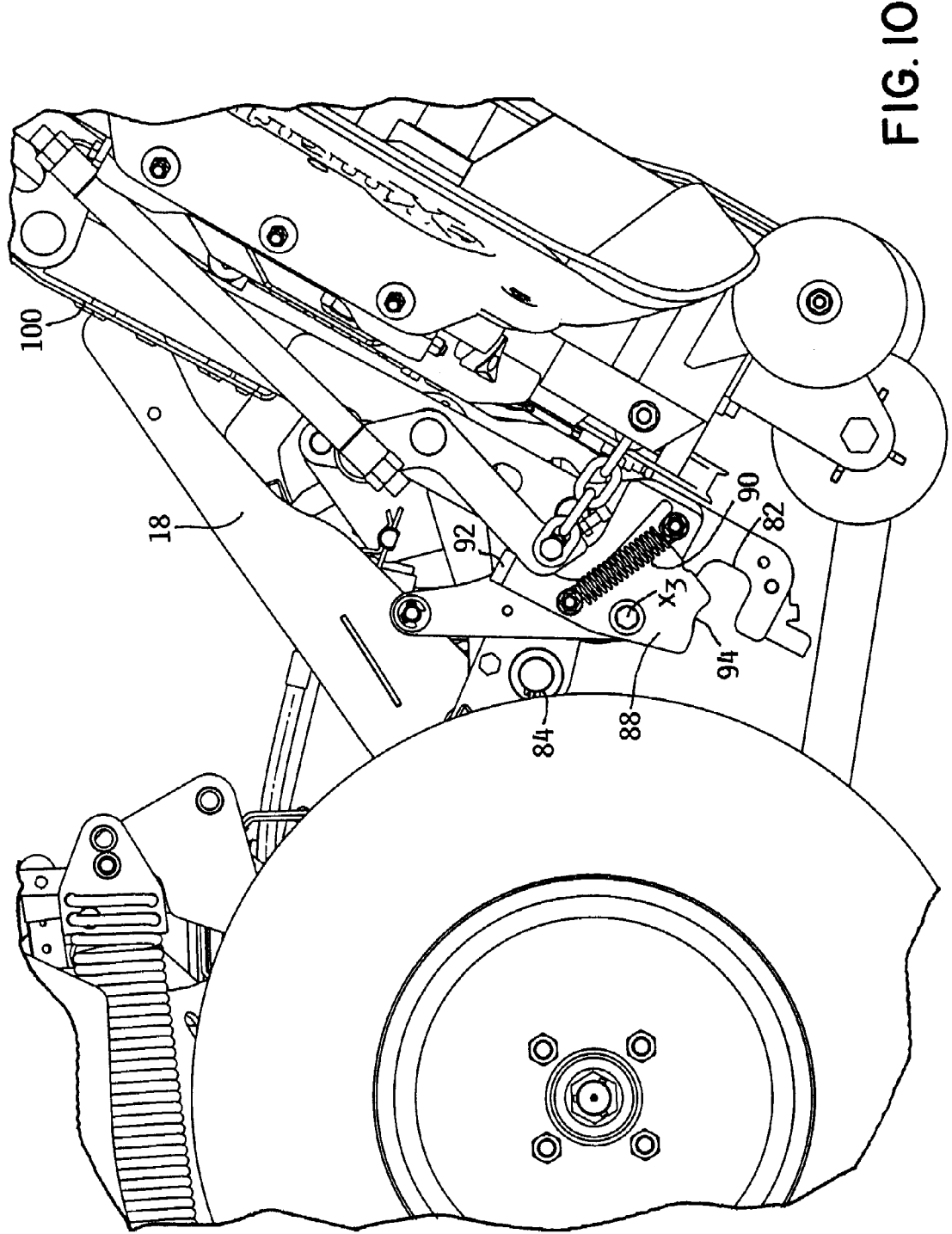
FIG. 10 is a side elevational view similar to FIG. 8, but particularly illustrating the cutting deck having been folded up relative to the traction unit into the service or storage position of the cutting deck.

As deck 6 is folded, handles 92 of fold latches 86 come into contact with a portion of hitch assembly 10. This contact toggles fold latches 86 back into their latched positions as shown in FIG. 10. Thus, latches 86 reset themselves into the proper position in which latch pins 84 are able to cam their way back into engagement with detents 94 as deck 6 is subsequently unfolded. There is no need for the operator to manually reset fold latches 86.

Carrier frame 8, and thus deck 6, can be folded into various service/storage positions in which the underside of deck 6 is exposed for service or maintenance. Such service/storage positions include the 500 folded position shown in FIG. 12 and the 70° folded position shown in FIG. 13, as well as other positions in between these two positions or even folded positions somewhat less than 50°. The exact position reached depends upon the degree of retraction of piston rod 60 and whether full fold lock pin 96 is used or not.

Conveniently, the system of this invention for folding carrier frame 8 and deck 6 utilizes the same hydraulic cylinder 60 used in the height of cut adjustment system. This is simple and economical in terms of the numbers and types of components used to achieve deck folding. Moreover, the folding of deck 6 can be locked out during normal mowing by locking carrier frame 8 relative to hitch assembly 10. This allows carrier frame 8 and deck 6 to follow the ground contours by pitching back and forth about the ground following pivot axis x1.

The Center Step and Front Viewport

The center of carrier frame 8 is provided with a non-skid center step 100 formed in the same way as side steps 34 on deck 6. Center step 100 thus preferably has a dimpled or roughened top surface to provide a better gripping surface for the operator's shoes. Center step 100 provides a convenient way for the operator to mount or dismount traction unit 4. The operator can mount from the front simply by stepping up onto center step 100 in order to reach seat 16. Alternatively, the operator can mount from the side by stepping up onto one of side steps 34 on deck 6 and from there by stepping up onto center step 100 of carrier frame 8.

Pivotal floor pan 18 carried on the front of traction frame 12 in advance of seat 16 overlies the rear of center step 100 on carrier frame 8. Center step 100 includes a pair of longitudinal slots 102 therein. Slots 102 cooperate with and receive a pair of downwardly extending hooks 104 when carrier frame 8 is folded up relative to hitch assembly 10 and floor pan 18 gets cammed upwardly by center step 100.

Figure 14:
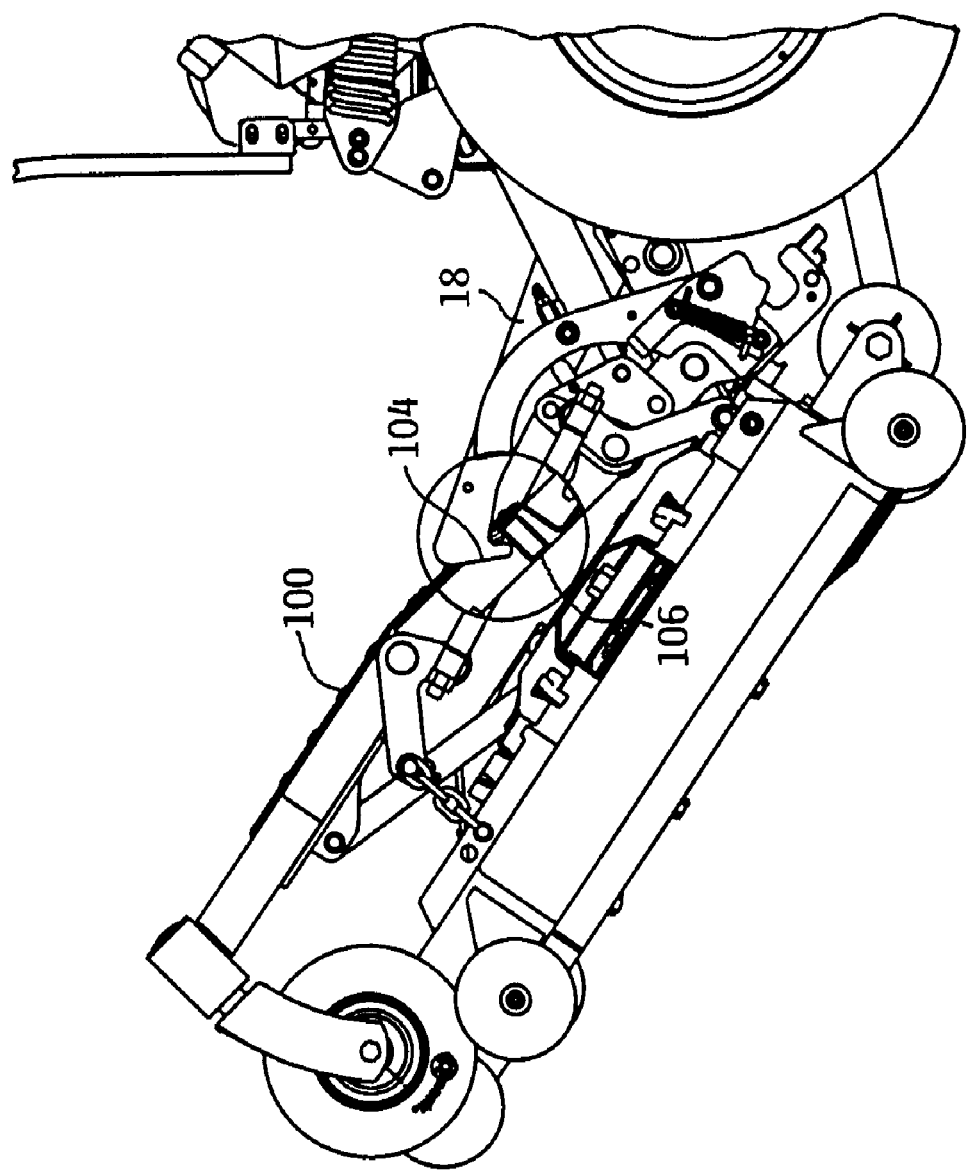
FIG. 14 is a side elevational view of the mower of FIG. 1, particularly illustrating how the pivotal floor pan on the traction unit interacts with the carrier frame as the cutting deck is folded upwardly with the circled portion in FIG. 14 being a broken away portion to illustrate the latch hooks formed on the front of the pivotal floor pan.
Figure 15:
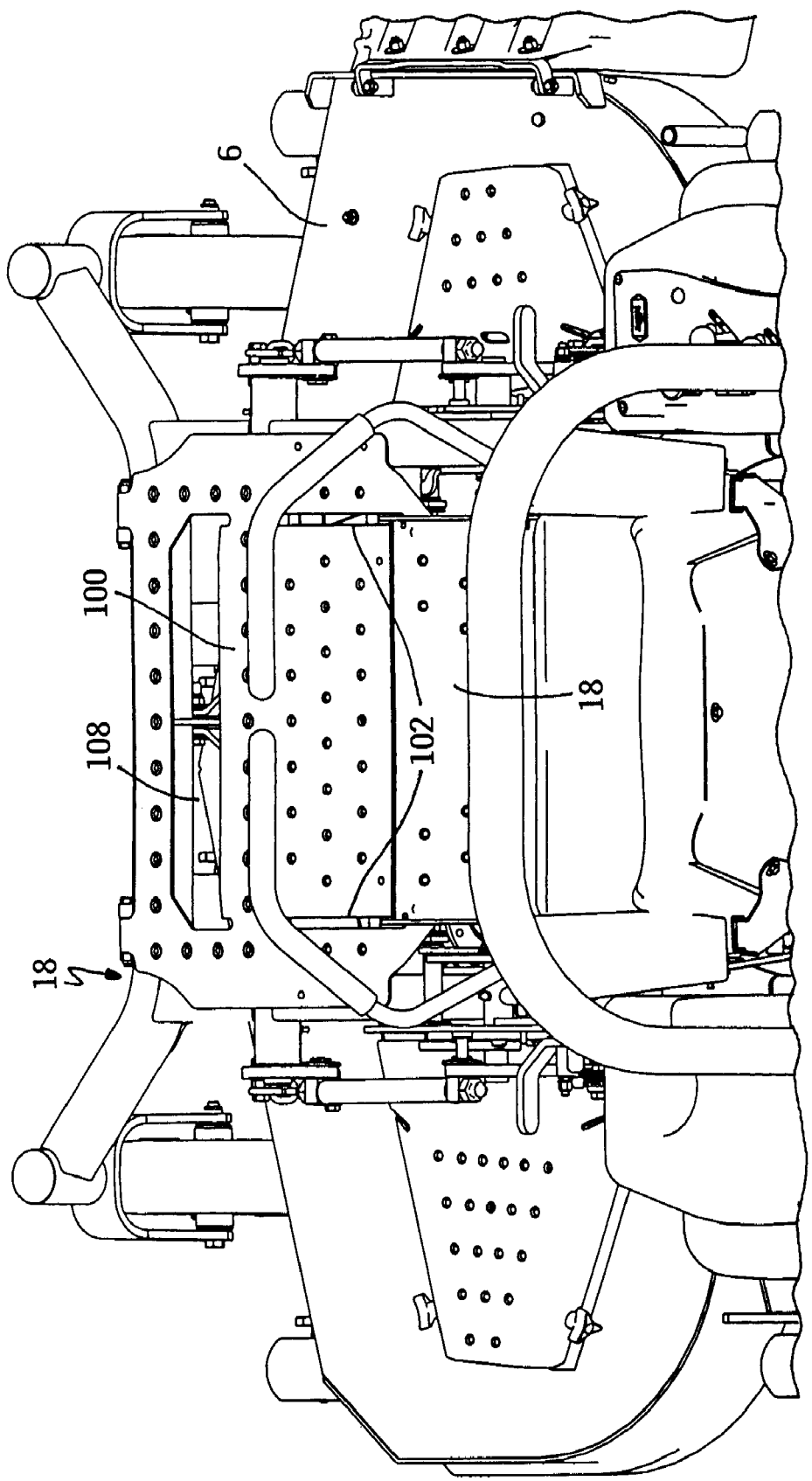
FIG. 15 is a perspective view of the front of the cutting deck of the mower of FIG. 1, particularly illustrating the front viewport in the center step provided on the carrier frame to allow an operator to more easily mount and dismount the mower.

At some point in the process of folding carrier frame 8, hooks 104 on floor pan 18 drop into slots 102. Hooks 104 on floor pan 18 can latch or hook beneath a cross member 106 on the underside of center step 100 when carrier frame 8 reaches at least the 50° folded position. See FIG. 14. This will help stabilize carrier frame 8 in its first service/storage position and will help hold carrier frame 8 in this position independently of the action of cylinder 60. The operator must manually lift up on floor pan 18 to disengage hooks 104 before carrier frame 8 can be dropped down by unfolding carrier frame 8 from hitch assembly 10.

Center step 100 desirably extends substantially all the way to the front of carrier frame 8 where the outrigger arms for the front caster wheels join the front of carrier frame 8. In this location, the operator's view of the front edge of deck 6 would be obstructed by center step 100. A front viewport 108 is cut or otherwise formed in center step 100 with the front viewport extending across a substantial majority of the width of center step 100. The front viewport is on a line between the front edge of deck 6 and the height of the eyes of a seated operator of average height such that the operator can observe the front edge of deck 6 during mowing when the operator is seated on seat 16.

Various modifications above will be apparent to those in the art. Thus, this invention will be limited only by the appended claims.

We claim:

1. A mower for cutting grass, which comprises:
   (a) a traction unit having a prime mover, the traction unit being supported for rolling over the ground, the traction unit including a plurality of wheels at least one of which is a drive wheel for propelling the traction unit over the ground, the traction unit also including a seat for carrying a seated operator;
   (b) a carrier frame operatively coupled to the traction unit for carrying a cutting deck having at least one rotary blade for cutting grass, wherein at least a portion of the carrier frame overlies at least a portion of a front edge of the cutting deck with the seat on the traction unit being located behind the portion of the front edge of the cutting deck;
   (c) a step surface provided on the overlying portion of the carrier frame to help an operator mount or dismount from the traction unit by stepping onto the carrier frame, wherein the step surface is located to block the operator's view from the seat to the portion of the front edge of the cutting deck; and
   (d) a viewport in the step surface to allow the operator to see the portion of the front edge of the cutting deck while seated on the seat.

2. The mower of claim 1, wherein the step surface is a dimpled surface.

3. The mower of claim 1, wherein the step surface is a non-skid surface.

4. A mower for cutting grass, which comprises:
   (a) a traction unit having a prime mover and a seat for carrying a seated operator, the traction unit being supported for rolling over the ground;
   (b) a carrier frame having a pair of forwardly extending arms, wherein each arm carries a rotatable, ground engaging front wheel;
   (c) a cutting deck having at least one rotary blade for cutting grass, wherein the cutting deck is carried by the carrier frame with the forwardly extending arms of the carrier frame passing over the cutting deck and with the front wheels on the arms of the carrier frame being located ahead of adjacent portions of a front edge of the cutting deck;
   (d) a step surface located between the forwardly extending arms of the carrier frame in advance of the seat to allow the operator to mount or dismount the seat by stepping onto the step surface to approach the seat, wherein the step surface extends far enough forwardly relative to the carrier frame such that a front portion of the step surface blocks the view of the operator of a portion of the front edge of the cutting deck between the ground engaging wheels when the operator is seated on the seat; and
   (e) a viewport in the step surface to allow the operator when seated on the seat to see through the step surface and observe the portion of the front edge of the cutting deck that would otherwise have been blocked to the operator's view by the front portion of the step surface.

5. The mower of claim 4, wherein each front wheel on each arm is a caster wheel.

6. The mower of claim 4, wherein the viewport is a transversely extending, elongated slot in the front portion of the step surface.

7. The mower of claim 4, wherein the carrier frame is separate from and connected to the traction unit.

8. The mower of claim 7, wherein the carrier frame is connected to the traction unit for pivoting relative to the traction unit about at least one horizontal, transverse pivot axis.

9. The mower of claim 4, wherein the cutting deck is connected to the carrier frame by a height of cut adjustment system.

10. The mower of claim 4, wherein the step surface is carried by the carrier frame.

11. The mower of claim 4, wherein the step surface extends transversely for a distance that bridges substantially entirely between the arms of the carrier frame.

* * * * *